United States Patent [19]

Denton

[11] Patent Number: 4,621,715

[45] Date of Patent: Nov. 11, 1986

[54] BRAKE DRUM DRYING FINS

[76] Inventor: Lynn Denton, 3205 10th Ave., Council Bluffs, Iowa 51501

[21] Appl. No.: 710,227

[22] Filed: Mar. 8, 1985

[51] Int. Cl.[4] .......................................... F16D 65/827
[52] U.S. Cl. ................................................ 188/264 R
[58] Field of Search .......... 188/264 R, 264 P, 264 W, 188/264 AA; 192/113 A

[56] References Cited

U.S. PATENT DOCUMENTS

| | | | |
|---|---|---|---|
| 2,795,302 | 6/1957 | Gaylord | 188/264 R |
| 2,808,910 | 10/1957 | Lyon | 188/264 W |
| 2,896,749 | 7/1959 | Gaylord | 188/264 R |
| 2,979,168 | 4/1961 | Lyon | 188/264 |
| 3,003,598 | 10/1961 | Sumner et al. | 188/264 |
| 3,023,858 | 3/1962 | Yocom | 188/264 |
| 3,033,328 | 5/1962 | Lyon | 188/264 |
| 3,127,959 | 4/1964 | Wengrowski | 188/264 |
| 3,142,364 | 7/1964 | Mikkelson | 188/264 R |
| 3,500,972 | 3/1970 | Talmage | 188/264 |

*Primary Examiner*—Duane A. Reger
*Attorney, Agent, or Firm*—Zarley, McKee, Thomte, Voorhees & Sease

[57] ABSTRACT

An apparatus for drying and cooling a brake drum includes an elongated flexible strip adapted to be wrapped around the peripheral wall of the brake drum with a plurality of fins extended radially inwardly from the strip. The fins are twisted so that the free edges are inclined at an acute angle relative to the longitudinal centerline of the strip so that air flow is directed away from the braking surfaces within the drum in response to rotation of the brake drum when the vehicle is in use. An elongated tension spring having at least one flat surface may be placed over the strip for securing it onto the brake drum.

12 Claims, 7 Drawing Figures

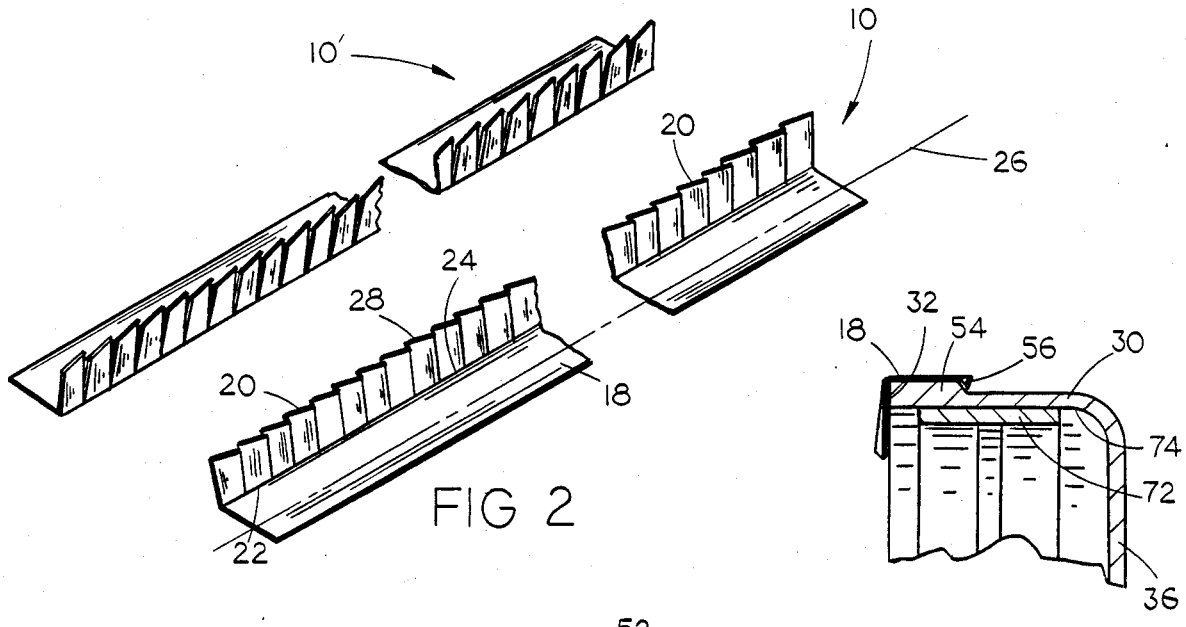
FIG 2
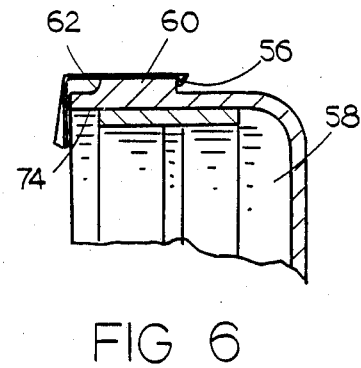
FIG 5
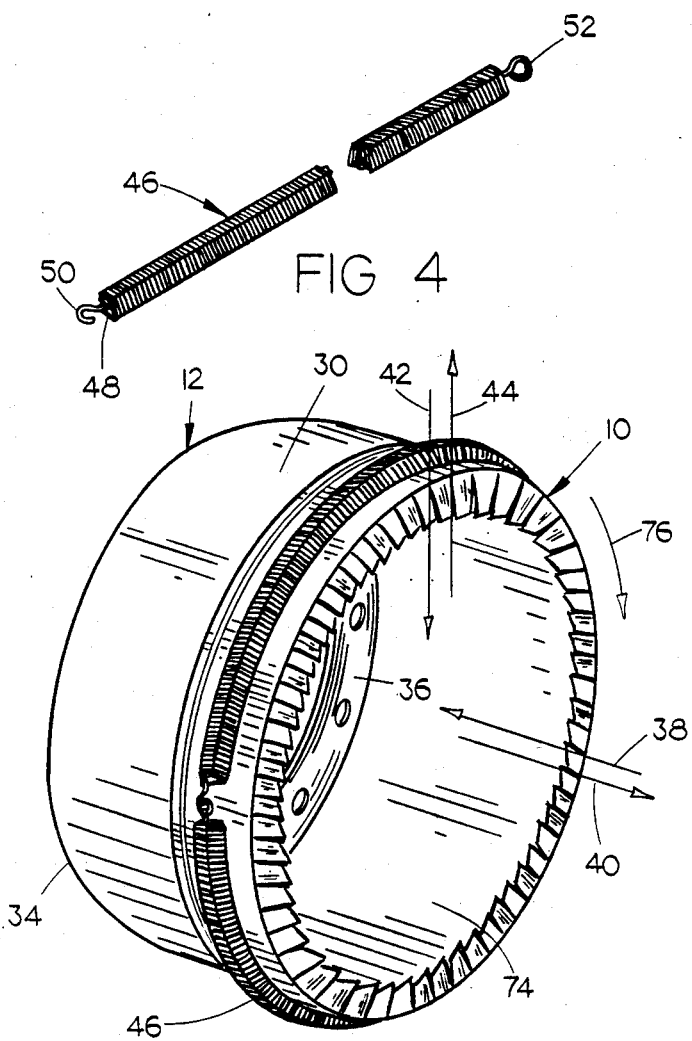
FIG 4
FIG 3
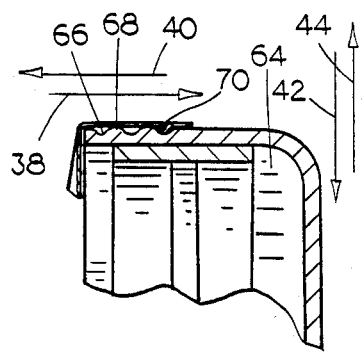
FIG 6
FIG 7

BRAKE DRUM DRYING FINS

BACKGROUND OF THE INVENTION

The present invention is directed generally to an apparatus for drying and cooling the brake drums of a vehicle and more particularly to a long flexible strip adapted to be placed around the outer periphery of a brake drum and having a turned down slit flange along one edge thereof defining a plurality of fan blades for directing air interiorly away from the braking surfaces to dry and cool them.

Approximately eighty percent of the accidents involving the big 18-wheel tractor-trailer trucks are caused by wet brakes. To dry their brakes, truckers can power brake (drive with the left foot on the brake pedal) but this results in significant wear of the brake shoes and drums. Mechanical shields have been proposed to keep the brakes dry but these cut off air circulation and make the brakes and wheel bearings run much hotter. Custom brake drums have been proposed including means for directing air exteriorly into the space between the wheel and brake drum but these are positioned radially away from the braking surfaces and operate to attract moisture along with the air.

A primary object of the present invention therefore is to provide an improved apparatus for drying and cooling brake drums while in use on the road.

Another object is to provide such an apparatus which is readily removable to facilitate pulling the brake drums and for checking the brake linings.

Another object is to provide a single such apparatus which fits different size brake drums.

Another object is to provide such an apparatus readily suited for use with single or multiple axle vehicles and trailers.

Another object is to provide such an apparatus which is economical to manufacture, easy to install and efficient in operation.

SUMMARY OF THE INVENTION

The apparatus for drying and cooling a brake drum, according to the present invention, includes an elongated flexible strip adapted to be wrapped around the peripheral wall of a brake drum adjacent the free interior edge thereof. A plurality of fins are connected to the strip and extended radially inwardly therefrom at a position adjacent to and interiorly of the interior edge of the brake drum. The fins are inclined relative to the plane of the interior edge of the brake drum for directing air flow interiorly away from the braking surfaces in response to rotation of the brake drum in the direction of travel. Thus a slight vacuum is created within the brake drum and the rush of air interiorly away from the brake drum serves both to dissipate both moisture on the braking surfaces as well as prevent the entry of moisture from the ambient atmosphere.

In a preferred embodiment of the invention, the fins are provided as an integral slit flange on the flexible strip with the individual fins being twisted so that the upper edges are disposed parallel to one another and at an acute angle relative to the longitudinal centerline of the strip. An expandable tension spring may be wrapped around the strip to removably secure it on the peripheral wall of the brake drum and it is preferred that the spring be formed of a flat surface and engagement with the strip.

BRIEF DESCRIPTION OF THE DRAWINGS

FIG. 2 is a foreshortened perspective view of a pair of right and left hand drying strips of the invention;

FIG. 3 is a perspective view of the brake drum drying and cooling apparatus of the invention installed on a brake drum;

FIG. 4 is a foreshortened perspective view of the securement spring of the invention;

FIG. 5 is a partial sectional view showing the apparatus of the invention installed on one type of brake drum;

FIG. 6 is a partial sectional view showing the apparatus of the invention installed on a second type of brake drum; and FIG. 7 is a partial sectional view showing the apparatus of the invention installed on a third style of brake drum.

DESCRIPTION OF THE PREFERRED EMBODIMENT

Figure 1:
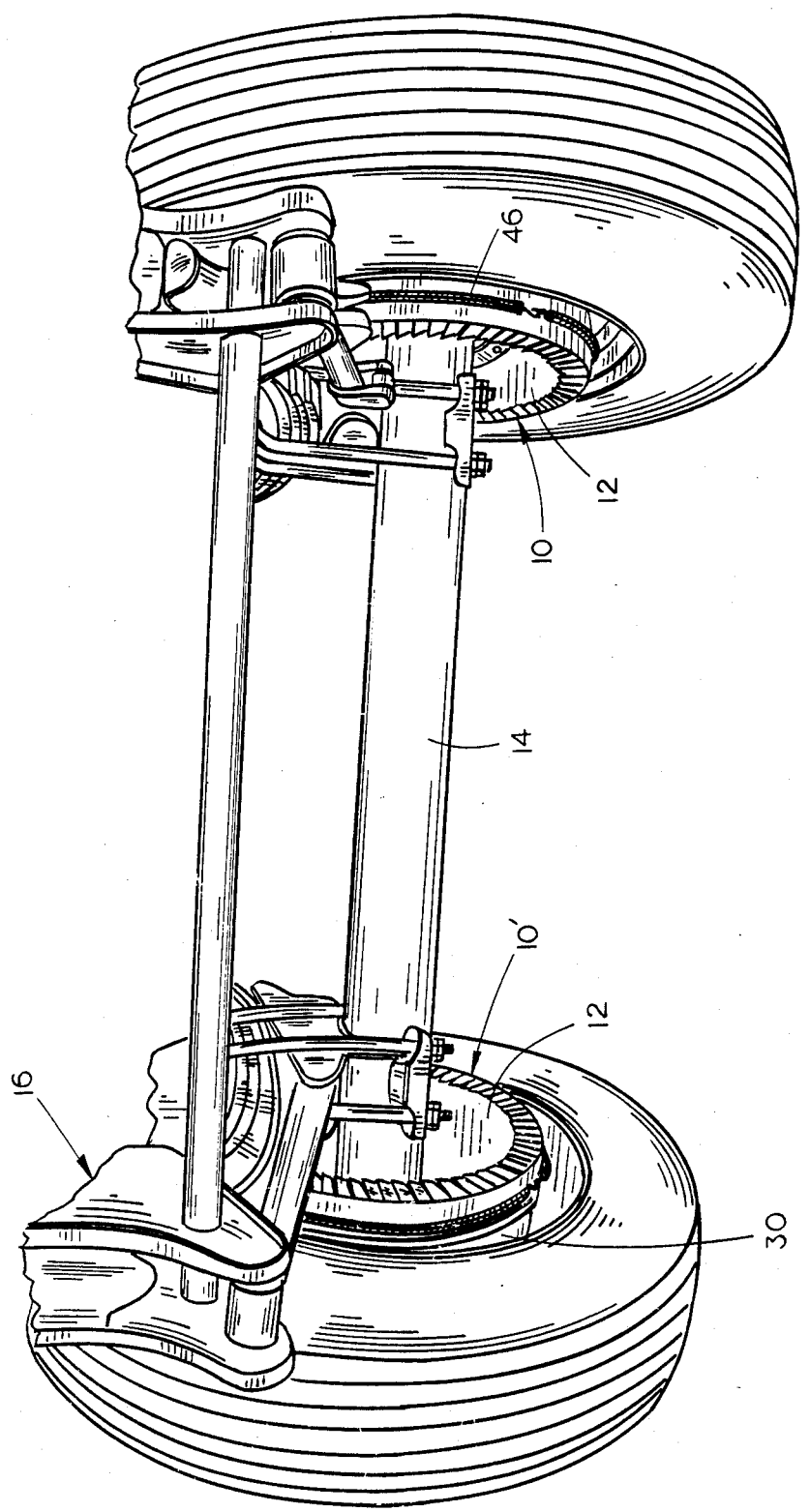
FIG. 1 is a perspective view of the wheels and brake drums on the opposite ends of an axle at the rearward end of a truck-trailer.

The brake drum drying and cooling apparatus 10 of the present invention is shown in FIG. 1 in its installed position on a brake drum 12 on the rear axle 14 of a truck trailer, indicated generally at 16. A similar drying and cooling apparatus 10', which is constructed as the mirror image of apparatus 10, is installed on the brake drum 12' on the opposite end of axle 14 and on the opposite side of the trailer.

Apparatus 10 is shown in FIG. 2 as including an elongated strip 18 having a plurality of fins 20 extended upwardly therefrom along one edge 22. The fins are preferably formed as a slit flange integral with the strip 18, as illustrated. Thus the bottom edge 24 of each fin 20 is preferably disposed parallel to the longitudinal centerline 26 of strip 18, whereas the upper edge 28 is disposed at an acute angle to the longitudinal centerline 26. The fine are thus twisted uniformly as illustrated.

In use, the elongated strip 18 is wrapped around the generally cylindrical peripheral wall 30 of brake drum 12 adajcent the interior edge 32 thereof, FIG. 5. The opposite exterior edge 34 of the peripheral wall merges with an upright annular exterior wall 36 from which studs are exteriorly directed for supporting and attaching the vehicle wheels to the axle.

For clarification, "exterior" and "interior" refer to axially directions with respect to the brake drum as indicated by arrows 38 and 40, respectively in FIG. 3. Inwardly and outwardly refer to radial directions indicated by arrows 42 and 44 respectively.

Thus, upon wrapping the strip 18 around the brake drum peripheral wall 30 adjacent the interior edge 32, the fins 20 extend radially inwardly therefrom a dimension exceeding the thickness of the peripheral wall 30 so that the fins extend interiorly of the wall thickness, as clearly illustrated in FIG. 5.

The length of strip 18 is preferably selected to correspond to the largest circumference of the brake drums for which it is intended to fit. For placement onto brake drums of smaller diameter, the ends can simply be overlapped.

To secure the elongated strip 18 on the peripheral wall, a wrap-around spring 46 is provided, FIGS. 3 and 4. Spring 46 is preferably an expandable tension spring having a collapsed length somewhat shorter than the elongated strip 18. A preferred spring has a somewhat rectangle section shape with a one-inch wide flat surface 48 and approximately a ⅜-inch height. The opposite ends of the spring may be provided with appropriate hook and eye fasteners 50 and 52 or any other type of disengageable fastening means. When wrapped around the strip 18 as shown in FIG. 3, it is preferred that the spring exert approximately 30–35 pounds of tension per inch.

A secondary securement system for the elongated strip 18 is shown in FIGS. 5, 6 and 7 in connection with the placement of the strip onto various styles of brake drums. Brake drum 30 in FIG. 5 has a raised ridge 54. The width of the strip 18 is slightly longer than the width of the ridge 54 so that a ball peen hammer or the like may be used to crimp the strip 18 as indicated at 56 at about three spaced-apart locations about the periphery of the brake drum.

FIG. 6 illustrates another brake drum 58 wherein the raised ridge 60 is spaced exteriorly from the interior edge of the drum by a recess 62. The strip may be crimped over the exterior edge of the ridge in the same manner, however.

FIG. 7 shows another brake drum 64 wherein the outer surface is provided with rounded grooves and ridges 66 and 68. The strip 18 can be secondarily secured onto such a drum 64 by simply crimping the strip into one of the grooves as at 70 at about three spaced-apart locations about the periphery of the drum.

FIG. 5 diagrammatically illustrates the brake shoe 72 which is urged against the inner braking surface 74 of drum 12. It can be seen that the fins 20 overlie the braking surfaces of the shoe and drum so that the exterior air flow caused by the fins when the wheel is rotating tends to dissipate moisture on the braking surfaces and also to keep moisture in the ambient air away from the braking surfaces.

The orientation of the fins 20 with respect to the direction of rotation of the brake drum is important so that the air flow set up by the fins is directed away from the braking surfaces, not toward them. For example, in FIG. 3, the forward direction of rotation of the wheel is indicated by arrow 76 thus the trailing edge of each fin 20 is spaced further from the brake drum and is the leading edge of the fin so that the trailing edges are oriented to push air away from the braking surfaces. It will be apparent that the same drying strip will not be operative for the brake drums on both ends of the same axle, as shown in FIG. 1. One of them would thus tend to draw air toward the braking surfaces. This problem is resolved by simply providing pairs of the drying devices, as shown in FIG. 2, with the devices of each pair being constructed as the mirror images of one another.

Installation of the brake drum drying and cooling apparatus of the present invention can be accomplished in minutes. The strips need only be wrapped around the exposed brake drums at each end of a vehicle axle and held in place by simply sliding a spring 46 over and around the installed strip. Removal is also quickly and easily accomplished so that brake linings can be checked or brake drums can be pulled without interference by the drying and cooling apparatus of the invention.

Whereas the invention was primarily intended for drying the braking surfaces, the resulting cooling effects on both the drum and wheel bearings effectively extends the useful life of the vehicle on which the invention is installed.

Thus, there has been shown and described an improved brake drum drying and cooling apparatus which accomplishes at least all of the stated objects.

I claim:

1. An apparatus for drying and cooling a brake drum including a generally cylindrical peripheral wall extended interiorly from a generally upright annular exterior wall and terminating in a circular interior edge, said apparatus comprising:
    an elongated flexible strip adapted to be wrapped around the peripheral wall of a brake drum adjacent the interior edge thereof,
    a plurality of fins connected to said strip and extended upwardly therefrom at generally right angles thereto,
    said fins being twisted so that the upper edges thereof are disposed generally parallel to one another and at an acute angle relative to the longitudinal centerline of said strip whereby, upon wrapping said strip around the peripheral wall of a brake drum with said fins extending inwardly from the interior edge thereof, air flow is directed along the inner surface of said peripheral wall interiorly away from said interior edge in response to said rotation of the brake drum in one direction, and
    means for removably securing said strip on the peripheral wall of a brake drum.

2. The apparatus of claim 1 wherein said fins comprise a slit flange integral with said strip.

3. The apparatus of claim 2 wherein said strip and fins are formed of sheet metal.

4. The apparatus of claim 1 wherein said means for securing said strip on said peripheral wall comprises a wrap-around spring.

5. The apparatus of claim 4 wherein said spring comprises an elongated tension spring having at least one flat surface in engagement with said strip.

6. The apparatus of claim 1 further comprising a second apparatus constructed as the mirror image of said aforementioned apparatus for use on a brake drum on the opposite side of a vehicle.

7. In combination with a brake drum including a generally cylindrical peripheral wall extended interiorly of a generally upright annular exterior wall and terminating in a circular interior edge, a brake drum drying and cooling apparatus comprising:
    an elongated strip wrapped around said peripheral wall adjacent the inerior edge thereof,
    a plurality of fins connected to said strip and extended radially inwardly therefrom at a position adjacent to and interiorly of said interior edge, the radial extent of said fins exceeding the thickness of said peripheral wall whereby said fins extend radially inwardly of said peripheral wall,
    said fins being inclined relative to the plane of said interior edge for directing air flow along the interior surface of said peripheral wall interiorly away from said interior edge in response to rotation of said brake drum in one direction thereby to dry and cool said brake drum.

8. The combination of claim 7 wherein said elongated strip is removably wrapped around said peripheral wall and further comprising removable means for securing said strip on said peripheral wall.

9. The combination of claim 8 wherein said strip is wrapped around the outer surface of said peripheral wall.

10. The combination of claim 7 wherein said fins comprise a slit flange integral withsaid strip.

11. The combination of claim 7 wherein said means for securing said strip on said peripheral wall comprises a wrap-around spring.

12. The combination of claim 11 wherein said spring comprises an elongated tension spring having at least one flat surface and engagement with said strip.

* * * * *